United States Patent [19]
Finnigan et al.

[11] Patent Number: 5,345,490
[45] Date of Patent: Sep. 6, 1994

[54] METHOD AND APPARATUS FOR CONVERTING COMPUTED TOMOGRAPHY (CT) DATA INTO FINITE ELEMENT MODELS

[75] Inventors: Peter M. Finnigan; William E. Lorensen, both of Ballston Lake; Alan F. Hathaway, Clifton Park, all of N.Y.

[73] Assignee: General Electric Company, Schenectady, N.Y.

[21] Appl. No.: 722,989

[22] Filed: Jun. 28, 1991

[51] Int. Cl.$^5$ .................... G01N 23/083; G06F 15/31
[52] U.S. Cl. ........................ 378/4; 378/901; 395/120; 395/124; 364/413.19
[58] Field of Search ............... 378/4, 901; 395/119, 395/120, 122, 124; 364/413.14, 413.19

[56] References Cited

U.S. PATENT DOCUMENTS

| | | | |
|---|---|---|---|
| 4,694,404 | 9/1987 | Meagher | 364/518 |
| 4,710,876 | 12/1987 | Cline et al. | 364/414 |
| 4,729,098 | 3/1988 | Cline et al. | 364/414 |
| 5,123,084 | 6/1992 | Prevost et al. | 395/120 |
| 5,172,695 | 12/1992 | Cann et al. | 128/653.1 |
| 5,189,626 | 2/1993 | Colburn | 364/474.24 |
| 5,222,201 | 6/1993 | Lis | 395/120 |

OTHER PUBLICATIONS

Finnigan et al., "Merging CAT and FEM," Mechanical Engineering, Jul., 1990, pp. 32–38.

*Primary Examiner*—Paul M. Dzierzynski
*Assistant Examiner*—David V. Bruce
*Attorney, Agent, or Firm*—Patrick R. Scanlon; Paul R. Webb, II

[57] ABSTRACT

A method and apparatus for converting computed tomography (CT) data into finite element models. The system generates both 2-D and 3-D models using the automatic mesh generators, QUADTREE and OCTREE, which are founded on recursive spatial decomposition. Multiple slices of CT data are obtained by scanning the object to be modeled. The slices are stacked and processed to form a discrete solid model. The discrete solid model is an alternate geometry defined discretely rather than with continuous analytic curves and surfaces but still provides a foundation for automatic mesh generation. Since the QUADTREE and OCTREE automatic mesh generators map naturally to the discrete solid model, the integration of CT technology and automatic mesh generation can be achieved.

7 Claims, 6 Drawing Sheets

FIRST SUBDIVISION

INITIAL STATE

THIRD SUBDIVISION

SECOND SUBDIVISION

METHOD AND APPARATUS FOR CONVERTING COMPUTED TOMOGRAPHY (CT) DATA INTO FINITE ELEMENT MODELS

BACKGROUND OF THE INVENTION

This invention relates generally to finite element modeling and more particularly concerns a method and apparatus for generating finite element meshes from computed tomography (CT) data.

The generation of the finite element mesh continues to be the bane of the analyst and the principle bottleneck in the finite element modeling process. This problem is becoming somewhat ameliorated with the introduction of fully automatic mesh generators. Despite progress, commercial systems still lack robustness and have serious limitations, especially for geometrically complex industrial components. Conventional approaches to automatic meshing of a continuum require a solid model; i.e., a geometric representation that can ascertain if a point in space is inside, outside, or on the object. Unfortunately, a priori solid models are not always available for purposes of meshing. The most apparent reason for this is that computer-aided design (CAD) and computer-aided engineering (CAE) are not well integrated. Furthermore, wireframe and surface modeling technology still dominates CAD systems. Thus, there is typically a need to create a solid model as part of the CAE process. Several classical methods generate solid models, including top-down constructive solid geometry (CSG) and boundary representation (B-rep) approaches, as well as, bottom-up construction of areas and volumes.

Even in the presence of a solid model there are still barriers that must be overcome. First, the as-manufactured part may not be the same as the as-designed definition. This may be because of manufacturing tolerances in the system, material shrinkage, or part warpage caused by residual stresses. Thus, when analysis is performed on the designed part, the physical part dimensions may be sufficiently different that the analysis is suspect. Second, although analysis is ideally a scheduled task within the design/analysis process, before manufacturing or test, this is not always the case. In many instances, analysis is not performed at all, requisite 3-D analysis is so long that the component may have already been manufactured before the results of the analysis are known. Third, if a field failure does occur, then analysis of the failed component is mandated. Nominal dimensions may not suffice here. These scenarios point to a dramatic need for rapid turn around of analysis of the physical component.

Computed tomography (CT) is a technology that offers much promise in helping to address many of the above issues. This technology has been extensively used for medical diagnostics and for x-ray inspection of industrial components. Early applications of CT technology concentrated on creating images of three dimensional surfaces contained with the scanned cross-sectional or slice volume of the patient or part. Initial approaches created contours of material boundaries one slice at a time. Using the contours from adjacent slices, algorithms stitched the contours together to form triangular surfaces. These contour-based algorithms could not reliably and automatically handle adjacent slices that contained different numbers of contours.

SUMMARY OF THE INVENTION

Accordingly, it is an object of the present invention to generate finite element models directly from the manufactured part without the need for creating a conventional solid model.

More specifically, it is an object of the present invention to provide for the automatic and direct conversion of x-ray computed tomography (CT) data to finite element models.

It is another object of the present invention to allow newly manufactured components to be checked against their designs, thereby reducing the probability of component failure and other unforeseen problems.

It is still another object of the present invention to provide a method and apparatus for modeling complex industrial parts.

These and other objects are accomplished in the present invention by providing a system that generates both 2-D and 3-D models using the automatic mesh generators, QUADTREE and OCTREE, which are founded on recursive spatial decomposition. By forming a discrete solid model from the CT data, to which the automatic mesh generators map naturally, the present invention is able to integrate CT technology with automatic mesh generation. The discrete solid model can be thought of as an alternate form of geometry that operates on discrete spatial data rather than on continuous analytic curves and surfaces and provides functionality similar to conventional solid models.

The process of the present invention comprises scanning the object so as to produce multiple slices of CT data, processing the slices of data into the discrete solid model, and generating a finite element mesh from the discrete solid model using an automatic mesh generator.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
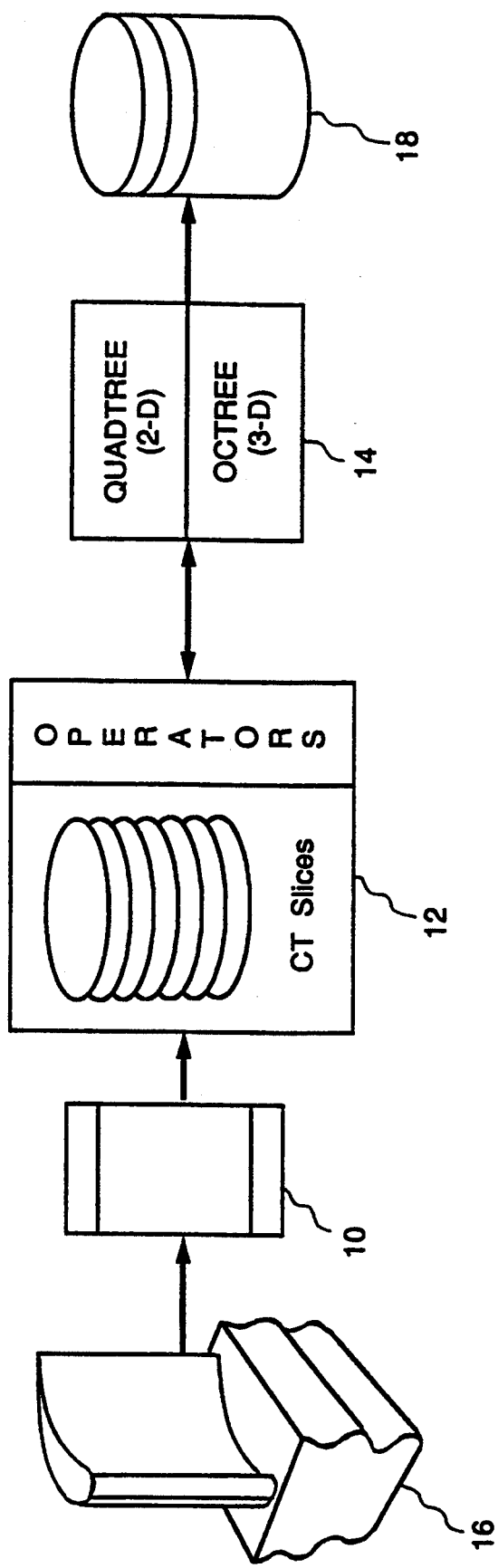
FIG. 1 is a block diagram showing the system architecture of the present invention.

Referring to FIG. 1, the system architecture of the present invention is shown. The present invention includes three subsystems: a scanning apparatus 10 which is preferably an x-ray computed tomography apparatus, a discrete solid model 12, and a fully automatic mesh generator 14. The process begins by scanning an object 16 to be modeled with the scanning apparatus 10. The scanning apparatus 10 produces images of thin slices through the cross-section of the object 16. The scanning process is carried out so as to produce several contiguous cross-sectional slices. This ensemble of slices, along with a set of geometrical operators explained more fully below, comprise the discrete solid model 12. The discrete solid model 12 is an alternate geometry defined discretely rather than with continuous analytic curves and surfaces but still provides a foundation for geometry-dependent applications, such as automatic mesh generation.

Once the discrete solid model 12 is created, the automatic mesh generator 14 uses the model to produce a finite element mesh shown in the Figure in the form of an input file 18. Automatic mesh generation is an algorithmic procedure which produces a valid finite element mesh in a domain of arbitrary complexity, given no inputs besides the geometric description of the part and some element discretization information. The automatic mesh generator 14 of the present invention uses two algorithms, depending on whether 2-D or 3-D solid meshes are desired. QUADTREE generates two dimensional meshes on arbitrary slices through the data set, whereas OCTREE generates general three dimensional solid meshes. The resulting finite element meshes 18 can be input to any finite element code with a simple formatting code.

The scanning apparatus 10 of the present invention is preferably an x-ray computed tomography device. However, other modalities, such as magnetic resonance imaging in particular, are also appropriate. In fact, any method that captures continuous spatial data in regularized discrete fashion would be appropriate for the present invention.

Both computed tomography and computer-assisted tomography (CAT) can produce images of thin slices through the cross sections of a human patient or a mechanical part. The CT machine uses a thin beam of radiation and detectors to determine how much of the radiation penetrates an object. By measuring the absorbed radiation at many locations around the object, the CT system can reconstruct a slice of the object. Typically, the resolution of these slices ranges from 256 by 256 to 1024 by 1024 pixels, with the pixel intensity containing up to 64,000 different values. Slice resolution is a function of the number of detectors. Originally developed for medical applications, industrial systems are available that can produce slices through metal parts. There are several devices on the market today with resolutions of 0.005 inches possible. Since metals absorb more energy than air, the CT slice's pixel intensities are higher in metal than air. Different metals absorb different amounts of radiation, so industrial CT machines can show multiple intensities for parts that include materials.

Traditionally, industrial inspection uses several 2-D slices through a part at critical locations. Today, with faster scanners and new algorithms, 3-D applications of CT are possible. Multiple slices, obtained by moving the source and detector arrays relative to the part between scans, produce 3-D data sets. These slices are stacked and processed to produce a model that can be visualized and measured.

A successful approach to processing multiple slices uses a divide-and-conquer technique to reliably produce triangular surfaces. This approach is referred to as the Marching Cubes algorithm and is described in U.S. Pat. Nos. 4,710,876 and 4,729,098. These patents, which are assigned to the same assignee as the present invention, are herein incorporated by reference. The Marching Cubes algorithm creates triangles from 3-D sets of slices. Marching Cubes solves the surface construction problem one voxel (or cube) at a time. A cube is formed from eight pixel values, four from each of the two adjacent slices. Using the notion that high pixel values exist outside the body, the algorithm classifies each of the eight vertices of the cube as either inside or outside. This means that there are only $2^8$, or 256, possible cube configurations. Marching Cubes build a table of edge intersections for each of the 256 cases and sequentially finds if and where a surface intersects each cube. For enhanced data visualization, the algorithm calculates a normal for each edge intersection, using the gradient of the original CT data.

The resulting ensemble of CT slices, along with a set of geometrical operators, define the discrete solid model 12. The model 12 can be thought of as another form of geometry; that is, geometry defined discretely rather than with continuous analytic curves and surfaces. This alternate form of geometry still possesses the attributes of a conventional solid model and can thus provide a foundation for automatic mesh generation. The geometrical operators are application-independent functions that provide provide data access and manipulation capabilities and are thus essential to the interface of the CT slices and the automatic mesh generation. The following operators have proven to be sufficient for automatic mesh generation:

Determine universe—returns, in model coordinates, the x,y,z range of the model.

Calculate normal—given a point in space and on the model, determines the outward normal to the model.

In/out test—given a point in space, determines whether the point is inside, outside or on the surface of the model.

Intersect line/surface—given two points defining a line, determines the points of intersection with the surface of the model.

Intersect plane/surface—given a plane in space, determines the intersection of the plane with the surface of the model and returns the intersections as loops of connected points.

Pop point to surface—given a point in space and close to the model's surface, pops the point onto the surface of the model.

To initialize the model, the system determines the resolution of each slice and the number of slices. The address of a pixel determines its x,y positions and the slice number determines the z location. These integer coordinates are scaled to real dimensions by each of the operators, so that the application can operate in model coordinates.

As stated above, a fully automatic mesh generator is an algorithmic procedure that generates a valid finite element mesh in a domain of arbitrary complexity, given no input past the original geometric description of the domain and some element discretization information. Many of the fully automatic mesh generation approaches that follow this definition are limited to 2-D and cannot be easily extended to 3-D. The approach that looks most promising is based on recursively subdividing a geometric model to the point where element generation can be easily performed; this approach is referred to as QUADTREE/OCTREE decomposition. QUADTREE/OCTREE decomposition naturally lends itself to fully automatic mesh generation.

Figure 2A:
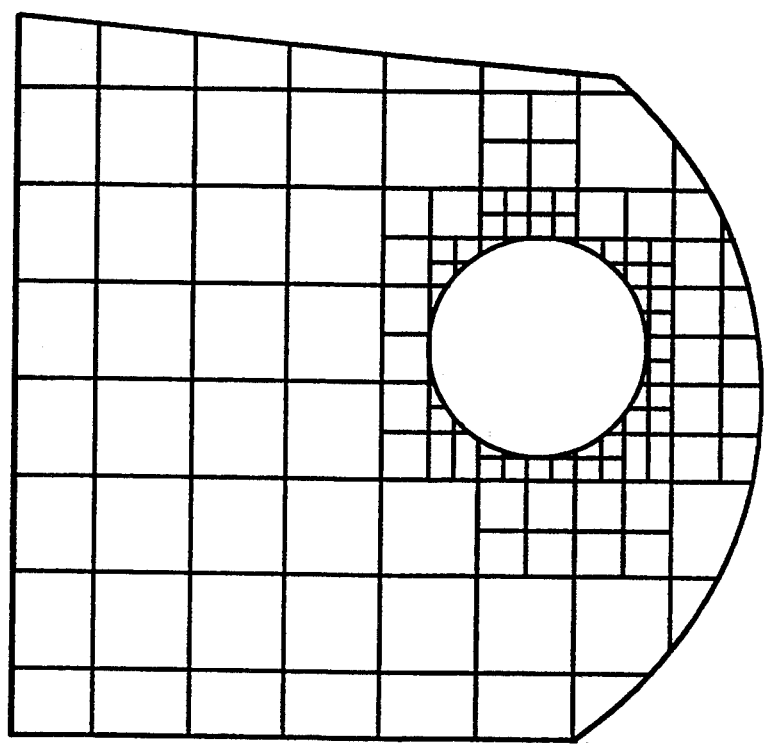
FIGS. 2A–2C show the three stages of mesh generation.
Figure 2B:
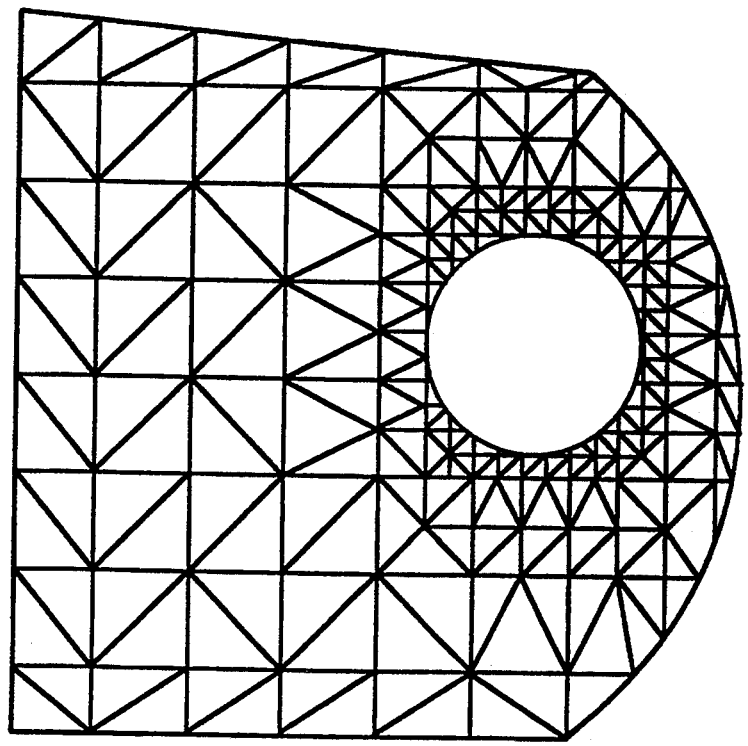
Figure 2C:
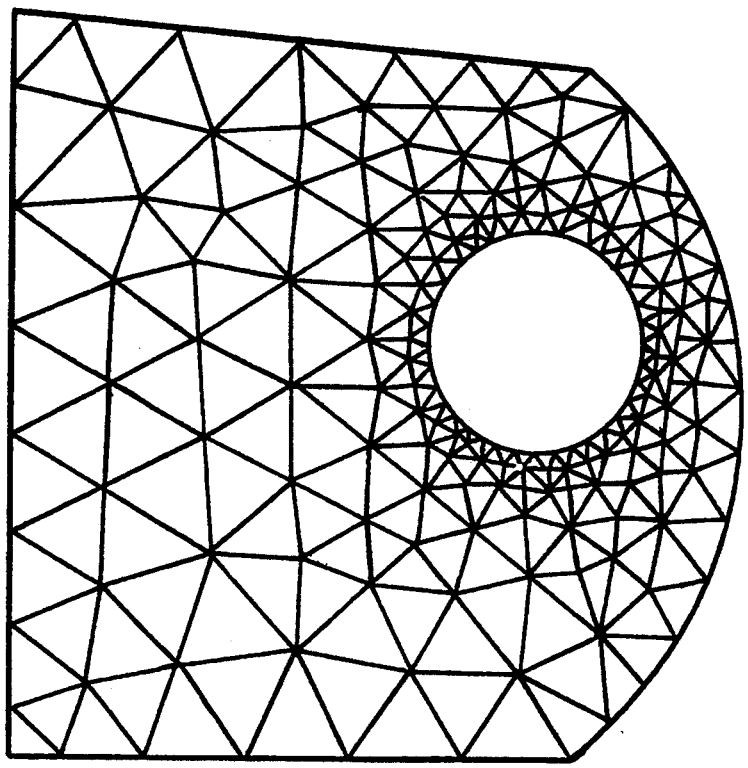
Figure 3B:
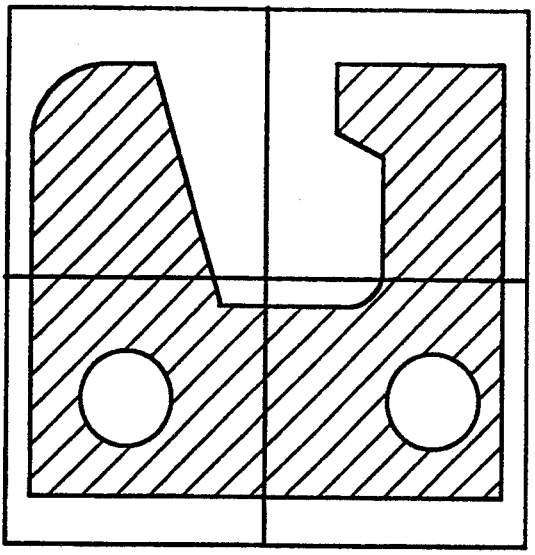
FIGS. 3A–3D illustrate a two dimensional example of the recursive subdivision of a part.
Figure 3A:
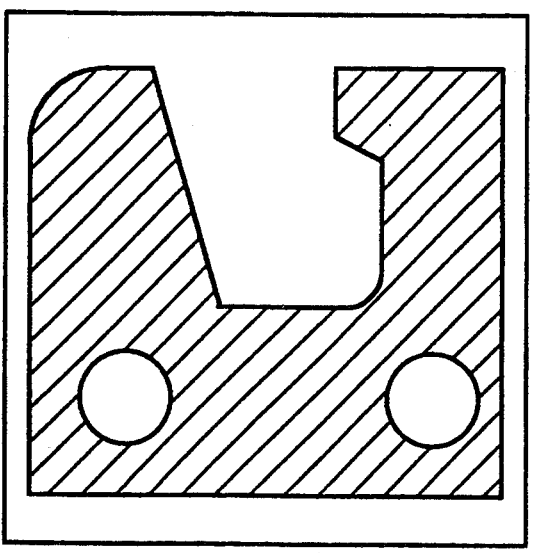
Figure 3D:
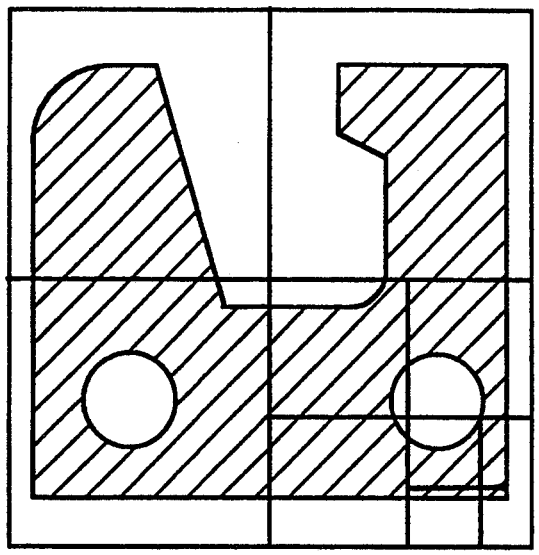
Figure 3D:
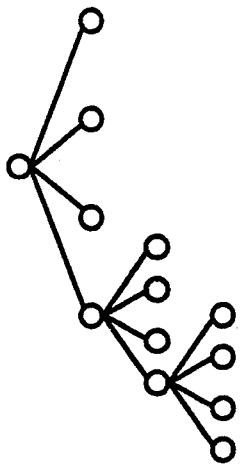
Figure 3C:
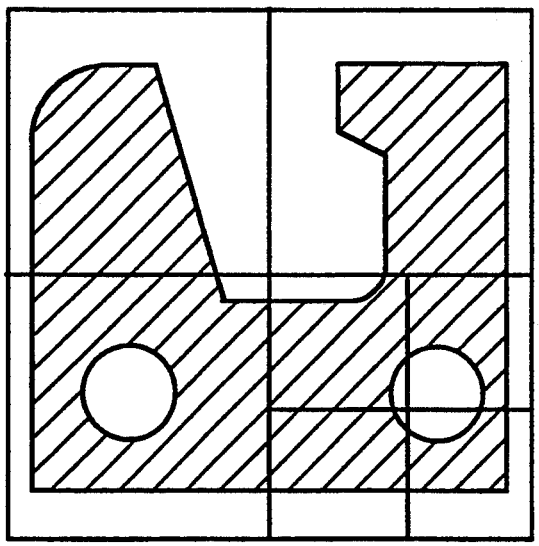
Figure 3C:
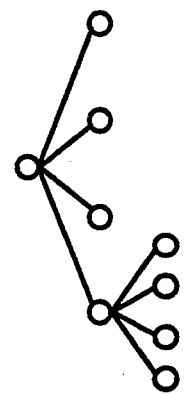

Fully automatic mesh generation based on the QUADTREE/OCTREE algorithms is a three-step process: cell decomposition or tree building (FIG. 2A), element generation (FIG. 2B), and mesh smoothing or nodal repositioning (FIG. 2C). Each step proceeds according to information obtained through interrogation of an unambiguous geometric description.

In tree-building, a QUADTREE/OCTREE approximation of a geometric model consists of a collection of variably sized, nonoverlapping cells whose union approximates the geometric model. The QUADTREE/OCTREE approximation for a geometry is obtained through recursive subdivision of the physical space enclosing the geometry. FIG. 3 shows a 2-D example. The approximation process proceeds as follows:

(i) enclose the geometry with a square Cartesian box and subdivide the box into four/eight regular cells (the terminology "four/eight" refers to the fact that there are four cells in two dimensions and eight cells in three dimensions);

(ii) classify each of the cells with respect to the geometry. When the cell is wholly interior or outside the geometry, the decomposition of that cell ceases. When a cell cannot be so classified, it is further subdivided into four/eight new cells;

(iii) continue the decomposition and classification process until the desired resolution is achieved.

Approximations produced by the decomposition scheme outlined above can be represented by logical trees whose nodes have four/eight offsprings. As illustrated in FIG. 3, each node corresponds to a cell in the recursive decomposition process.

For mesh generation, the classical QUADTREE/OCTREE approximation must be modified. In its standard form the boundary of an object is represented as a series of re-entrant steps that introduce artificial discontinuities into the mesh. This situation is resolved by modifying boundary cells that the true geometry is captured. Furthermore, is is possible to represent the geometry with neighboring cells that have a large size difference. To avoid abrupt differences in mesh density, neighboring cells are forced to have no more than a 2-to-1 level difference by subdividing the larger octants to the appropriate level.

Once the cell decomposition process has been completed, the original geometry is represented as the union of all cells. In any given cell, the geometric complexity has been greatly reduced, thereby simplifying the element generation process.

Element generation proceeds on a cell-by-cell basis, creating triangular elements for 2-D and tetrahedral elements for 3-D. Cells that are interior to the geometric model are decomposed into elements using templates. The difficulty in element generation arises in those cells lying on the boundary of the geometric model. Here, a more general approach based on the Delaunay triangulation is utilized.

The Delaunay triangulation has the property that the n-dimensional simplexes which compose it have circumscribing hyperspheres (in 2-D, circumcircles, and in 3-D, circumspheres) that contain no other point of the triangulation. The Delaunay algorithm is ideally suited to generating finite element meshes because the resulting triangulation has been shown to be optimal.

Because the Delaunay triangulation uses only point data, and does not incorporate higher dimensional geometry information, the generated mesh may be topologically incompatible with the original geometry. This situation may be resolved by introducing additional points into the triangulation to the point of incompatibility.

In the past, the use of Delaunay triangulation techniques to produce computational grids has proceeded across an entire point set. In the QUADTREE/OCTREE based approach, elements are generated on a cell-by-cell basis. Information is then communicated between cells to insure mesh compatibility. This approach provides a method for error recovery since meshing failures in a cell can be identified and then corrected on a local basis.

Once the mesh as been generated for the geometric model, further improvement in overall mesh quality can be achieved by smoothing the mesh. In smoothing, the topology of the mesh remains unchanged, but the coordinates of the modes are adjusted to improve mesh quality. A simple but effective approach is Laplacian smoothing which iteratively repositions the nodes based on the connectivity of a node to its neighbors.

The role of geometry is extremely important in fully automatic mesh generation because the mesher must correctly capture the geometry to be meshed without user intervention. This requires full access to the geometric representation, and in addition, it requires a set of geometric operators that are used to interrogate that representation. The set of operators required by a fully automatic mesh generation algorithm is a function of the algorithm and its implementation.

The set of requisite geometric interrogation operators used in the QUADTREE/OCTREE implementation described above fall into the following three classes:
1) Basic queries
2) Intersection operations
3) Parametric evaluations In the QUADTREE/OCTREE approach, the three step meshing process proceeds based on information received from the various geometric interrogations made in a previous step. For example, cell decomposition (i.e., recursive subdivision process) needs to compute intersections. To construct cells that accurately represent the true geometry of the part, operators are used to insure that the intersection results are properly classified with respect to the model. During element generation, points are added to the Delaunay triangulation, requiring the intersection operators. Finally, much of the mesh smoothing process is performed in parametric space which requires the re-evaluation of many points.

The QUADTREE/OCTREE approach described herein is nearly independent of the geometric representation. The most important ingredient is the availability of a set of generic geometric interrogation operators.

The process of converting discrete computed tomography (CT) data into a finite element model begins by operating on the raw data received from the x-ray scan of a part. This approach couples the QUADTREE/OCTREE algorithms of spatial decomposition and Delaunay triangulation with the CT data, using the geometric operators provided by the discrete solid model.

QUADTREE/OCTREE cell decomposition uses a top-down recursive subdivision of the computational domain. If uniform subdivision occurs far enough, then the resulting tree representation is equivalent to the discrete solid model. In other words, the CT slices that form a set of contiguous cross-sections form voxels (cubes made up of eight pixels) and the QUADTREE/OCTREE decomposition forms octants,. The one-to-one correspondence between voxels and octants illustrates the commonality between the discrete solid model and the QUADTREE/OCTREE approach to finite element mesh generation. However, since the discrete solid model is at the resolution of the x-ray machine, the problem that quickly emerges is that using the entire CT database (every voxel as an octant) results in the generation of several hundred thousand finite elements, typically too many for analysis. Therefore, the goal is to generate a tree representation at a coarser resolution using the digital replica operators to extract the appropriate geometric detail, which will then result in the desired finite element mesh.

The foregoing has described a new technology that permits the direct and automatic conversion of computed tomography (CT) data to finite element models. The system creates an alternate geometrical form, the discrete solid model, which enables the integration of CT imaging technology with fully automatic mesh generation.

While specific embodiments of the present invention have been described, it will be apparent to those skilled in the art that various modifications thereto can be made without departing from the spirit and scope of the invention as defined in the appended claims.

What is claimed is:

1. A method of generating a finite element model of an object comprising the steps of:
   scanning the object so as to produce multiple slices of geometrical data of the object;
   processing said multiple slices of data into a discrete solid model; and
   generating a finite element mesh from said discrete solid model using an automatic mesh generator.

2. The method of claim 1 wherein said step of scanning the object is carried out with a computed tomography apparatus at multiple locations along an axis of the object.

3. The method of claim 1 wherein said step of generating a finite element mesh comprises recursively subdividing said discrete solid model into cells.

4. A method of generating a finite element model of an object comprising the steps of:
   scanning the object with a computed tomography device at multiple locations along an axis of the object so as to produce multiple slices of geometrical data of the object;
   processing said multiple slices of data into a discrete solid model; and
   generating a finite element mesh directly from said discrete solid model using an automatic mesh generator.

5. A system for converting geometrical data into a finite element model comprising:
   means for producing multiple slices of geometrical data of the object;
   means for generating a discrete solid model from said multiple slices of geometrical data; and
   means for automatically generating a finite element mesh from said discrete solid model.

6. The system of claim 5 wherein said means for producing multiple slices of geometrical data comprises a computed tomography device.

7. The system of claim 5 wherein said means for automatically generating a finite element mesh comprises a fully automatic mesh generator based on a recursively subdividing geometrical model.

* * * * *